(12) United States Patent
Cairns et al.

(10) Patent No.: US 9,292,280 B2
(45) Date of Patent: Mar. 22, 2016

(54) SYSTEMS AND METHODS FOR MULTI-TIERED FORMAT REGISTRATION FOR APPLICATIONS

(71) Applicant: Google Inc., Mountain View, CA (US)

(72) Inventors: Brian Lewis Cairns, Boulder, CO (US); Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 23 days.

(21) Appl. No.: 13/834,557

(22) Filed: Mar. 15, 2013

(65) Prior Publication Data
US 2015/0199196 A1 Jul. 16, 2015

(51) Int. Cl.
*G06F 9/44* (2006.01)

(52) U.S. Cl.
CPC ........................................ *G06F 8/71* (2013.01)

(58) Field of Classification Search
CPC .................... G06F 17/3006; G06F 9/44505
USPC .................................................. 717/120–121
See application file for complete search history.

(56) References Cited

U.S. PATENT DOCUMENTS

| | | | |
|---|---|---|---|
| 6,047,312 A | 4/2000 | Brooks et al. | |
| 6,092,114 A | 7/2000 | Shaffer et al. | |
| 6,952,714 B2 * | 10/2005 | Peart ............................ | 709/203 |
| 7,065,588 B2 | 6/2006 | Konda et al. | |
| 7,409,405 B1 * | 8/2008 | Masinter et al. .............. | 707/102 |
| 7,461,096 B1 * | 12/2008 | Hurren ...................... | G06F 8/60 |
| 7,613,798 B2 | 11/2009 | Mickeleit | |
| 8,250,518 B2 * | 8/2012 | Averett ................. | G06F 9/4446 |
| | | | 717/100 |
| 8,694,607 B2 | 4/2014 | Darnell et al. | |
| 9,002,808 B1 * | 4/2015 | Liu .................... | G06F 17/30126 |
| | | | 707/694 |
| 2003/0041095 A1 | 2/2003 | Konda et al. | |
| 2004/0030995 A1 | 2/2004 | Bhogal et al. | |
| 2004/0155901 A1 * | 8/2004 | McKee et al. ................. | 345/747 |
| 2005/0131992 A1 | 6/2005 | Goldstein et al. | |
| 2005/0200887 A1 | 9/2005 | Bai | |
| 2006/0059174 A1 * | 3/2006 | Mese ...................... | G06F 9/445 |
| 2006/0070029 A1 * | 3/2006 | Laborczfalvi et al. ........ | 717/120 |
| 2008/0222517 A1 | 9/2008 | Halim et al. | |
| 2008/0256634 A1 | 10/2008 | Pichler | |
| 2009/0193030 A1 | 7/2009 | Gorsev et al. | |

(Continued)

FOREIGN PATENT DOCUMENTS

| | | |
|---|---|---|
| EP | 1360581 | 11/2003 |
| EP | 2383649 | 11/2011 |

OTHER PUBLICATIONS

International Search Report and Written Opinion dated Sep. 2, 2013 in International Application No. PCT/US2013/043255.

(Continued)

*Primary Examiner* — Duy Khuong Nguyen
(74) *Attorney, Agent, or Firm* — Ropes & Gray LLP

(57) ABSTRACT

Systems and methods are disclosed for multi-tiered registration of file formats for applications. A processor receives a registration request from a developer of an application to register an application with a list of primary formats and a list of secondary formats. The processor associates the list of primary formats and the list of secondary formats with the application, and the processor receives an open request from a user to open a file having a file format. The application is determined to be associated with a primary format corresponding to the file format, and the application is selected to open the file.

16 Claims, 6 Drawing Sheets

(56) References Cited

U.S. PATENT DOCUMENTS

| | | |
|---|---|---|
| 2010/0035682 A1 | 2/2010 | Gentile et al. |
| 2010/0325155 A1 | 12/2010 | Skinner et al. |
| 2011/0208822 A1 | 8/2011 | Rathod |
| 2011/0296048 A1 | 12/2011 | Knox et al. |
| 2012/0278805 A1 | 11/2012 | Shin et al. |
| 2013/0067600 A1 | 3/2013 | Graham |
| 2013/0110905 A1 | 5/2013 | Howe et al. |
| 2013/0282755 A1* | 10/2013 | Procopio ........... G06F 17/30126 707/770 |

OTHER PUBLICATIONS

International Search Report dated Jul. 22, 2014 in International Application No. PCT/US2014/037625.

* cited by examiner

| APPLICATION ID | PRIMARY FORMAT | SECONDARY FORMAT | USER PREFERENCE |
| --- | --- | --- | --- |
| 514 | [PSD] | [TIF, JPEG, PNG] | 2 |
| 765 | [PDF] | [TEXT, JPEG, PNG] | 4 |
| 238 | [] | [PDF, PPT, TEXT, SPREADSHEET, JPEG, PNG] | 3 |
| 1574 | [XLS, SPREADSHEET] | [] | 1 |
| 1854 | [PDF, TEXT] | [] | 5 |

SYSTEMS AND METHODS FOR MULTI-TIERED FORMAT REGISTRATION FOR APPLICATIONS

TECHNICAL FIELD

In general, this disclosure relates to cloud storage systems, in particular, to systems and methods for supporting a multi-tiered registration of file formats for applications.

BACKGROUND

Cloud storage systems are file hosting systems that allow users to store and retrieve data accessible from one or more user devices. These storage systems may use cloud storage to store user data. Sometimes, cloud storage systems allow application developers to register for one or more formats (or file types) that the applications are configured to open. Often, developers and/or users make an application the default application to open all files having a file format that the application is configured to open. Different applications can be configured to open files of the same format, so there may be multiple applications designated as a default application for a particular format. However, one of the applications may support the particular format in a limited context, while another application may support the format more extensively. Thus designating multiple applications as the default application for opening a file of the same format may lead to conflicts.

SUMMARY

Systems and methods are disclosed herein for providing a multi-tiered registration of file formats for applications. One aspect relates to a system or method for identifying an application using a multi-tiered system. A processor receives a registration request from a developer of an application to register an application with a list of primary formats and a list of secondary formats. The processor associates the list of primary formats and the list of secondary formats with the application, and the processor receives an open request from a user to open a file having a file format. The application is determined to be associated with a primary format corresponding to the file format, and the application is selected to open the file.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure stored on a database that includes data related to applications and their related formats, according to an illustrative embodiment.

DETAILED DESCRIPTION

To provide an overall understanding of the systems and methods described herein, certain illustrative embodiments will now be described, including a system for multi-tiered registration of formats for applications. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

The present disclosure provides systems and methods for providing multi-tiered registration of formats for applications. Sometimes, applications are made the default application for a large number of formats. The systems and methods disclosed herein identify an appropriate application for opening a file of a specific format. In particular, the present disclosure relates to a system that allows developers of applications to register their applications with primary formats and secondary formats in a multi-tiered system. As used herein, a format refers to a file format, file type, or a particular way in which data is encoded in a computer file.

Figure 1:
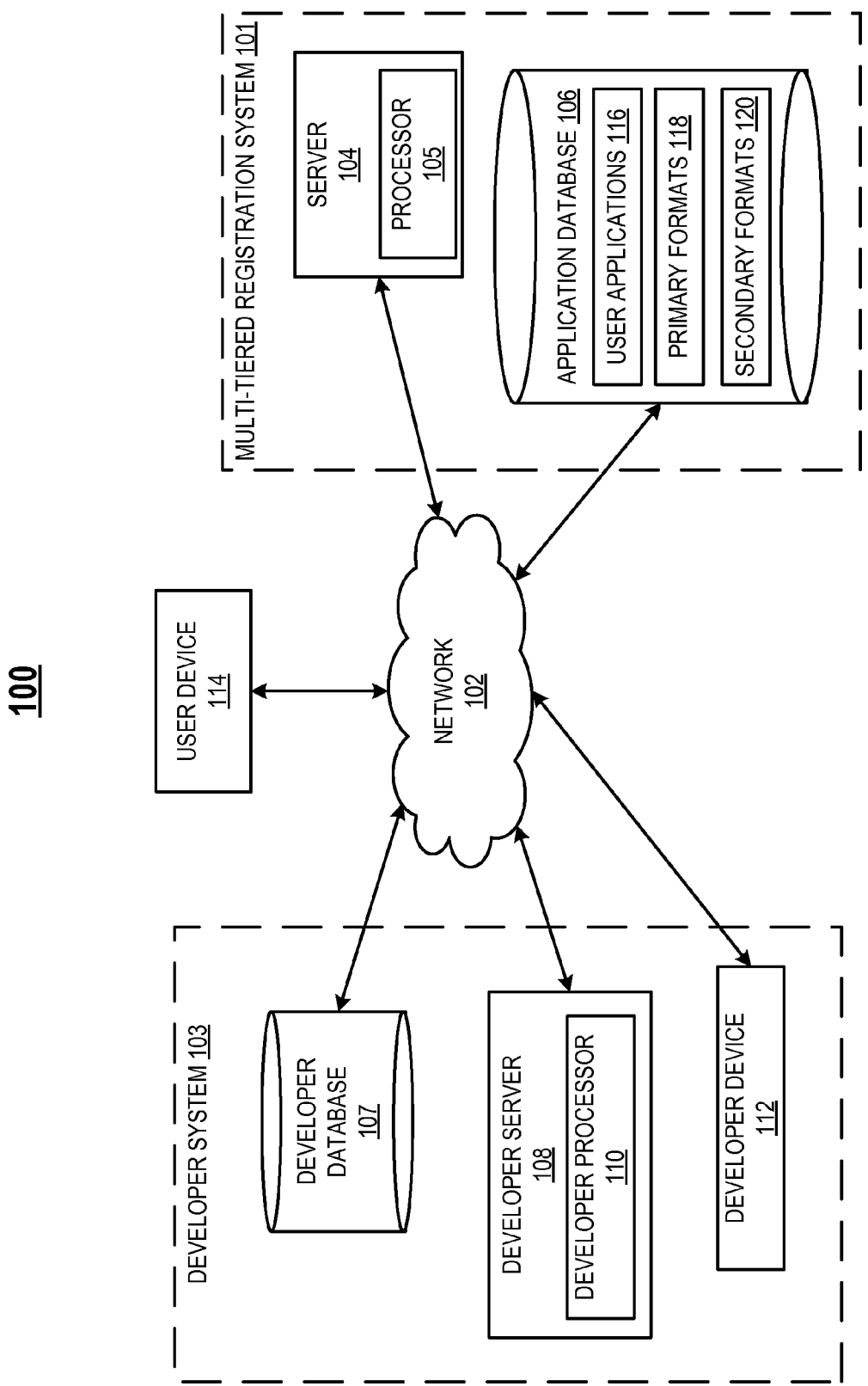
FIG. 1 is a block diagram of a computerized system for providing multi-tiered registration of formats for applications, according to an illustrative embodiment.

FIG. 1 depicts an example of a network and database structure that may be used to implement the systems and methods herein. FIG. 1 is a block diagram of a computerized system 100 for providing multi-tiered registration of formats for applications. The system 100 includes a multi-tiered registration system 101, a user device 114, and a developer system 103. The multi-tiered registration system 101 includes a server 104 including a processor 105 and an application database 106 that stores data related to a list of user applications 116, primary formats 118, and secondary formats 120. As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that are currently being processed. An illustrative computing device 600, which may be used to implement any of the processors and servers described herein, is described in detail with reference to FIG. 6. As used herein, "developer device" and "user device" include, without limitation, any suitable combination of one or more input devices (e.g., keypads, touch screens, trackballs, voice recognition systems, etc.) and/or one or more output devices (e.g., visual displays, speakers, tactile displays, printing devices, etc.). As used herein, "server" includes, without limitation, any suitable combination of one or more devices configured with hardware, firmware, and software to carry out one or more of the computerized techniques described herein. Only one multi-tiered registration system 101, one user device 114, and one developer system 103 are shown in FIG. 1 to avoid complicating the drawing. In general, the system 100 can support multiple multi-tiered registration systems, developer systems, servers, databases, developer devices, and user devices.

The multi-tiered registration system 101 allows for application developers to register their applications for different tiers of file formats. In particular, a developer may register an application for a set of primary formats and a set of secondary formats. The application is configured to open files with file formats corresponding to both primary formats and secondary formats. However, the application is designated as a default application to open files with file formats corresponding to a primary format, while the application is designated as a non-default application to open files with file formats corresponding to a secondary format. By allowing the application developer to separate the set of file formats that the application is configured to open into a default group (i.e., primary formats) and a non-default group (i.e., secondary formats), the multi-tiered registration system 101 reduces the number of conflicts that arise when multiple applications are designated as default applications for the same file format.

In one embodiment, the multi-tiered registration system 101 is a part of a cloud storage system, which is a file hosting system that allows users to store, retrieve, and modify data via one or more user devices such as the user device 114. This data may be referred to as a user's web data. As an example, the cloud storage system 101 may be stored on a single server system or in a distributed system. In particular, the cloud storage system 101 may use cloud storage to store user data.

The application database 106 stores several types of data. In particular, the application database 106 stores data associated with user applications 116, primary formats 118, and secondary formats 120. The user applications 116 may be stored as a list of applications associated with a user. For example, the set of user applications 116 may correspond to a list of all applications that the user has ever used to open a file, or with which the user has selected to be associated. As an example, when the multi-tiered registration system 101 is a part of a cloud storage system, the user's web data includes a set of files with various formats. In this case, the list of user applications 116 may correspond to a set of applications that the user has used to open any file in the user's web data, or a set of applications that are configured to open any file within the user's web data. In general, the list of user applications 116 may be associated with the user, or a set of files associated with the user.

In addition, the application database 106 also stores a set of primary formats 118 and a set of secondary formats 120. One or more applications in the list of user applications 116 may be associated with a list of primary formats 118 and a list of secondary formats 120. In particular, a developer of an application may use the developer system 103 to register the application with a set of primary formats and secondary formats. When a user selects to open a file, the user may provide an "open file by default" request or an "open file in general" request. In particular, when the user transmits an "open file by default" request (by providing a left-click on a mouse, or any other suitable user input, for example), an application that is associated with a primary format that matches the file's format is selected to open the file by default. However, if no such application exists in the list of user applications 116, then the processor 105 may display a screen or a message to the user indicating that no such default application was identified. In another example, the user may transmit an "open file in general" request (by providing a right-click on a mouse, or any other suitable user input, for example). In this case, the processor 105 may parse the list of user applications 116 to identify one or more application that are associated with either a primary format or a secondary format that matches the file's format to open the file. Any identified applications may be displayed to the user in a menu, and the user may select an application from the menu to open the file. In this way, the multi-tiered registration system 101 provides a way for application developers to indicate which file formats would be most suitable for using their application to open, and which file formats would be less suitable. By separating the set of file formats that the application is configured to open into two tiers, the multi-tiered registration system 101 results in fewer conflicts than if the file formats were combined in a single tier. An example data structure 200 of five applications and their primary formats and secondary formats is shown in FIG. 2.

The developer system 103 communicates with the multi-tiered registration system 101 over the network 102 to register an application for suitable primary formats and secondary formats. As depicted in FIG. 1, the developer system 103 includes a developer database 107, a developer server 108, a developer processor 110, and a developer device 112. The developer database 107 may store developer files or data. In an example, the developer system 103 is associated with a particular application, and the developer system 103 is configured to transmit a request to the multi-tiered registration system 101 for registering the application with a list of primary formats and secondary formats. If the multi-tiered registration system 101 grants the request, the application database 106 is updated with the particular application, the requested primary formats, and the requested secondary formats.

FIG. 2 is an example data structure 200 stored on the application database 106 that includes data related to applications, according to an illustrative embodiment. The data structure 200 includes a list of five applications, each corresponding to an application associated with a user. For each application, the data structure 200 has a field entry for an application identifier, which may be a unique string of letters and/or numbers that are assigned to each application.

Each application is associated with a list of primary formats and a list of secondary formats. In particular, the multi-tiered registration system 101 may be used to register a set of primary formats and a set of secondary formats with each application. The set of primary formats indicates the file formats which the associated application would open by default. In contrast, the set of secondary formats indicates the file formats which the associated application is configured to open, but will not open by default. Thus, the set of primary formats and the set of secondary formats are mutually exclusive such that the same format would not appear on both lists. The application developer may register the application for the different formats, or another user may associate the application with various formats. In addition, a set of primary formats and/or secondary formats associated with an application may be empty, as shown in the data structure 200 for application ids 238, which has no primary format, or for application ids 1574 and 1854, which have no secondary formats.

As an example, application 514 may be an image editor. Application 514 is associated with one primary format "psd," which may be a proprietary file format for application 514. In particular, application 514 may be a specialized image editor that is the only application that can open "psd" files, such that it is desirable to use application 514 to open "psd" files by default. For example, a file of the "psd" format may include data specific to application 514, such as data related to various effects that application 514 may use to make changes to an image file.

In addition, application 514 is associated with three secondary formats of format "tif," "jpeg," and "png." A developer of application 514 may determine that it would be undesirable to use the specialized image editor application for opening files of a secondary format by default. In an example, application 514 may have a slow start-up time, and when a user selects to open a file of format "tif," "jpeg," or "png," the user may simply want to view the contents of the image file rather than edit the image. In this case, another application such as an image viewer may be more appropriately designated as a default application (so that the image viewer application would have a set of primary formats including "tif," "jpeg," and/or "png"). Thus, even though application 514 is configured to open files of format "tif," "jpeg," and "png," it may be undesirable to designate application 514 as a default application for files of these formats. Therefore, these formats are the secondary formats associated with application 514. In another example, it is desirable to associate an application with a list of one or more secondary formats if the application is configured to open a large number and a wide variety of formats. As an example, a text editor may support several tens of formats (such as txt, js, xml, c, cpp, cxx, java, html, or any other suitable text format, for example). While the text editor is configured to open all of these formats, it may be desirable to restrict the set of primary formats for the text editor, so as to avoid potential conflicts with other applications that support text formats. In general, the examples described herein are for illustrative purposes only, and one of ordinary skill in the art will understand that a developer of an application may associate any number of secondary formats with the application for any reason.

Thus, when the developer of application 514 registers application 514 for primary formats and secondary formats, the developer may indicate that the proprietary format "psd" is suitable as a primary format and that other image formats are suitable as a secondary format. In particular, by registering the proprietary format as a primary format, the developer designates that the image editor application should be used by default to open files of format "psd," and should not be used by default to open files of other formats. Thus, by associating an application with primary formats and secondary formats, the systems and methods described herein allow for application developers to control how the applications are used to open files of certain formats by default.

In addition to storing a set of primary formats and a set of secondary formats associated with each application, the data structure 200 also includes field entries for user preference. The processor 105 may use the user preference entries to determine a sorted order of the applications in the data structure 200. The user preference entry for each application is indicative of a relative rank or preference that the user may set or be set by default. In some implementations, the lower the value of the user preference, the higher the rank of the corresponding application. For example, the application 1574 has the highest rank, followed by the application 514, the application 238, etc. The data in the user preference entries of the data structure 200 may be used to identify one or more applications suitable for opening a file. For example, if the user selects to open a "pdf" file, the processor 105 may parse the data structure 200 to determine which application(s) are associated with "pdf" as a primary format. In the data structure 200, there are two applications (765 and 1854) that are each associated with "pdf" as a primary format. In order to determine which application to use to open the file by default, the processor 105 may use the user preference data. For example, the processor 105 may select the default application to be the one with the highest ranking user preference (i.e., application 765).

Furthermore, the user may provide input over the user device 114 indicating the user's preference for ordering the applications. In an example, a user interface on the user device 114 may provide a region for the user to interact with one or more lists of applications. In particular, a "manage applications" option may be displayed to the user, and when the option is selected, a list of applications that may be sorted by the user preference data may be displayed to the user. The user may then select one or more applications to update the user preference data related to the corresponding applications. In an example, the user may specify at the "manage applications" option screen whether to make one or more applications possible default applications. In this case, when the user selects an application as a possible default application, the selected application may be automatically given the highest rank. In general, any suitable method of updating the user preference data may be used.

In addition to or instead of the fields shown, the data structure 200 may also include fields for the last time the application was used, a file format of the last file opened by the application, a list of users associated with the application, or any other suitable data associated with an application, or any suitable combination thereof. The data stored in the data structure 200 may include any such suitable information for identifying an appropriate application with which to open a file.

The system 100 may update the data structure 200. For example, when an application developer transmits a registration request, the appropriate entries in the data structure 200 may be updated to reflect the request. In addition, the user preference data may be updated when a corresponding application is installed or registered, or when the user selects to update the preference data.

Figure 3:
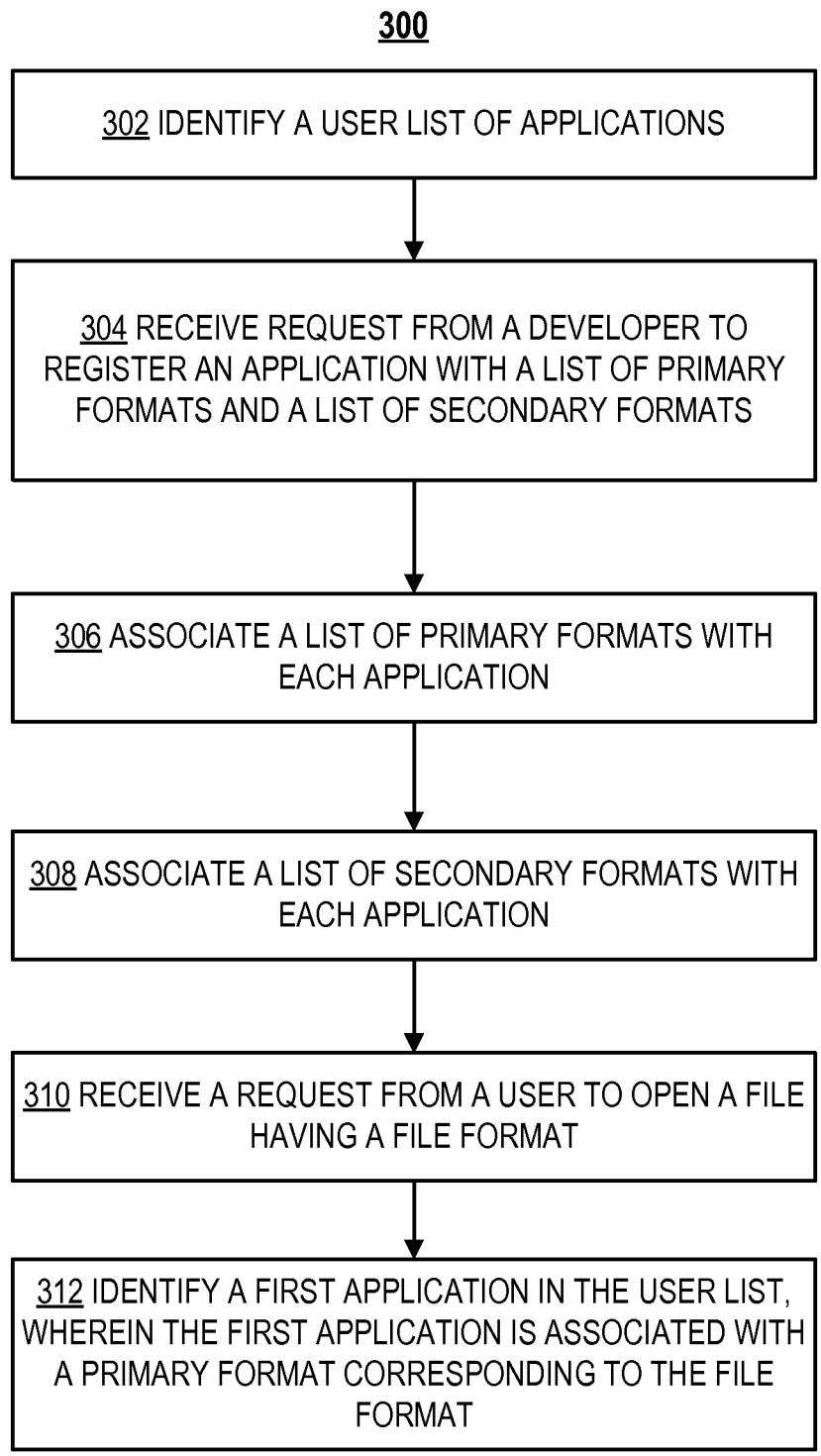
FIG. 3 is a flowchart of a method used by a processor to identify an appropriate application for opening a file, according to an illustrative embodiment.
Figure 4:
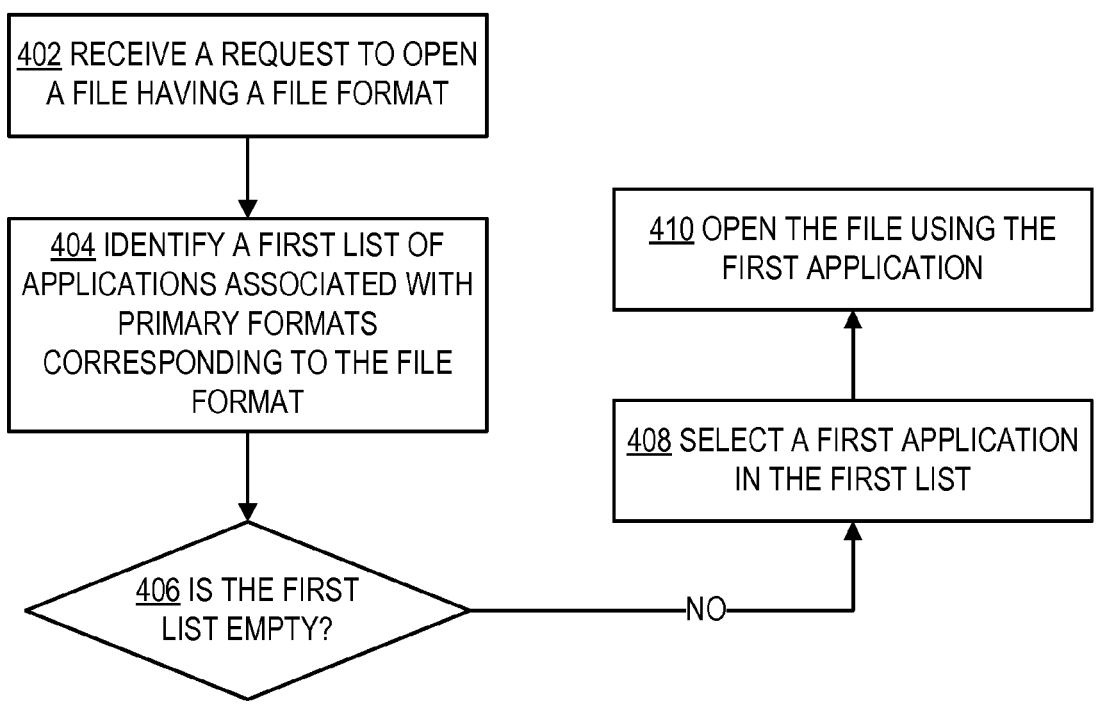
FIG. 4 is a flowchart of a method used by a processor to open a file using an appropriate application, according to an illustrative embodiment.
Figure 5:
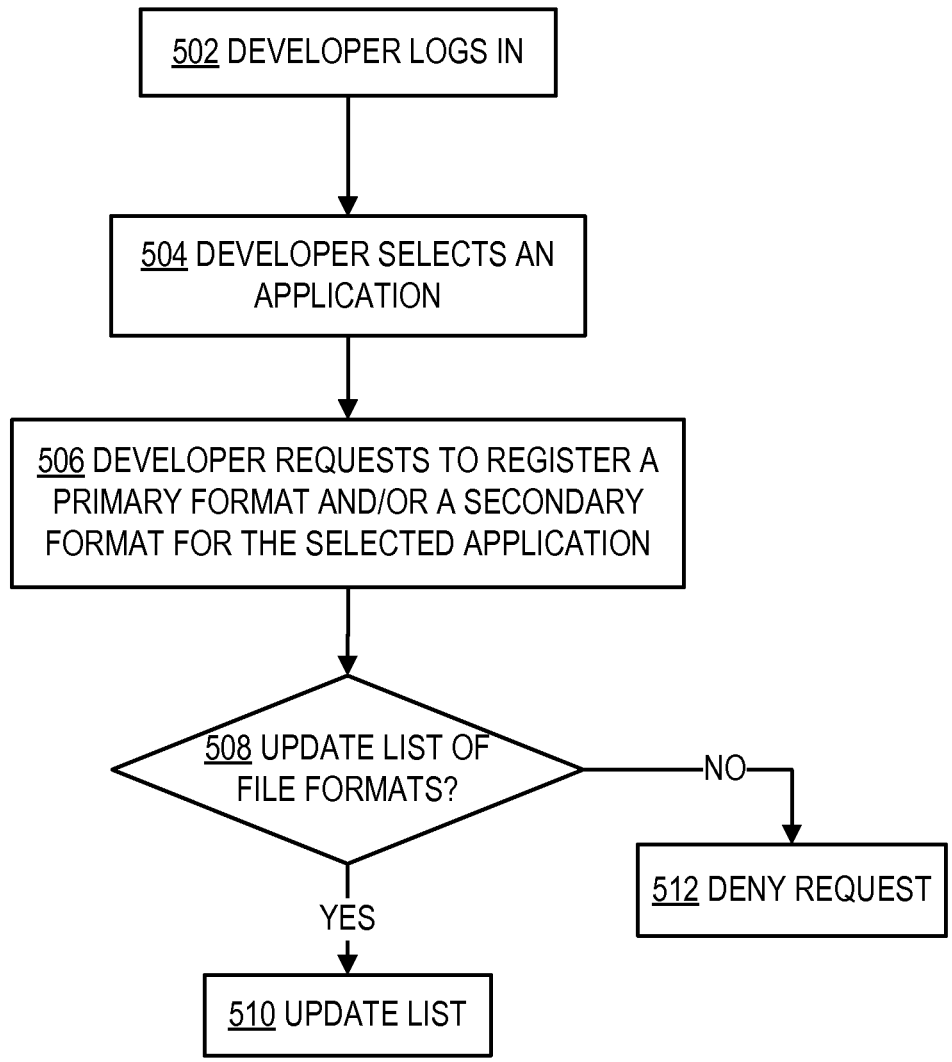
FIG. 5 is a flowchart of a method used by a processor to register an application with a list of primary formats and a list of secondary formats, according to an illustrative embodiment.

FIGS. 3-5 are flowcharts of methods that may be used by a processor such as processor 105 for performing the techniques described herein. In particular, FIG. 3 is a flowchart of a high level method 300 for using a system such as the multi-tiered registration system 101 to associate an application with different tiers of file format. FIG. 4 is a flowchart of a more detailed method 400 for identifying an appropriate application for opening a file. FIG. 5 is a flowchart of a method for updating a list of file formats associated with an application.

FIG. 3 is a flowchart of a method 300, as performed by the processor 105, for identifying an application using a multi-tiered system, according to an illustrative embodiment. The method 300 includes the steps of identifying a user list of applications (step 302), receiving a request from a developer to register an application with a list of primary formats and a list of secondary formats (step 304), associating a list of primary formats with each application (step 306), and associating a list of secondary formats with each application (step 308). The processor also receives a request from a user to open a file having a file format (step 310) and identifies a first application in the user list, the first application being associated with a primary format corresponding to the file format (step 312).

At step 302, the processor 105 identifies a user list of applications. For example, the user may log into the system 100 by providing authentication information such as a user name and password. After receiving valid authentication, the processor 105 identifies a list of applications associated with the user. For example, the user list of applications may include applications that have been installed on the user device 114. In another example, the user list of applications may include applications that have been associated with the user using a cloud storage system. In particular, the cloud storage system may include a set of files associated with the user, and the user list of applications may include a set of applications that the user has previously used to access one or more files in the set of files.

At step 304, the processor 105 receives a request from a developer to register an application with a list of primary formats and a list of secondary formats. The developer may transmit the request over the developer system 103 or any other suitable device in communication with the processor 105. In particular, the developer may use the developer device 112 to transmit the request to the processor 105. The process for how the developer may transmit the registration request is described in more detail in relation to FIG. 5. In general, the registration request from the developer may include an update to a list of primary formats and/or a list of secondary formats associated with the application. The update may include a removing, a replacing, or an appending of one or more formats to either list.

As an example, when the application is a proprietary application typically associated with a proprietary file format, the developer may wish to update the list of primary formats to include an updated version of the proprietary file format not previously associated with the proprietary application. In this case, the registration request includes a request to append the updated version of the proprietary file format to the list of primary formats. In another example, the developer may wish to remove one or more primary formats from the list. Similarly, the developer may wish to update an existing list of secondary applications to include one or more new secondary applications not previously associated with the application, or to remove one or more secondary applications previously associated with the application.

If the processor 105 grants the request from step 304, the application database 106 is updated with the particular application, the requested primary formats, and the requested secondary formats. In particular, at step 306, the processor associates a list of primary formats with each application. To associate an application with a list of primary formats, the processor 105 may update a data structure such as the data structure 200 to include the list of primary formats in the request. The request may include a new application, whose data may not have been previously stored in the data structure, such that in updating the data structure 200, the processor 105 creates a new field entry for the requested application. In this case, the list of primary formats is written into the empty cells for the appropriate field entry. In another example, the request may include an application already listed in the data structure 200, such that updating the data structure 200 includes updating the list of primary formats for the corresponding application. Furthermore, the request may include a list of primary formats to replace any existing list of primary formats associated with the application, or the list in the request may be used to supplement any existing list. The developer may provide an indication in the request as to whether the list of primary formats in the request is to replace or to supplement any existing list of primary formats associated with the application.

Similarly, at step 308, the processor associates a list of secondary formats with each application. To associate an application with a list of secondary formats, the processor 105 may update a data structure such as the data structure 200 to include the list of secondary formats in the request. The request may include a new application, whose data may not have been previously stored in the data structure, such that in updating the data structure 200, the processor 105 creates a new field entry for the requested application. In this case, the list of secondary formats is written into the empty cells for the appropriate field entry. In another example, the request may include an application already listed in the data structure 200, such that updating the data structure 200 includes updating the list of secondary formats for the corresponding application. Furthermore, the request may include a list of secondary formats to replace any existing list of secondary formats associated with the application, or the list in the request may be used to supplement any existing list. The developer may provide an indication in the request as to whether the list of secondary formats in the request is to replace or to supplement any existing list of secondary formats associated with the application.

At step 310, the processor receives a request from a user to open a file having a file format. The user may transmit the request to access the file over the user device 114. For example, the user may use a user input device such as a keyboard or a mouse at a user interface on the user device 114 to indicate the request. For example, after receiving user authentication information over the user interface, the user device 114 displays metadata associated with the file. The metadata may include a file name, a date and time created, a file format, or any other suitable metadata associated with a file. The user may select the file and request to access the file. One way that the user may transmit a request to access the file is described in more detail in relation to FIG. 4. In particular, the open request from the user may be one of two possible types. For example, the open request may be of an "open file by default" type or of an "open file in general" type. These types of open requests are described in more detail in relation to FIG. 4.

At step 312, the processor identifies an appropriate application in the user list to open the file in the user's request. To identify the appropriate application, the processor 105 may use a method that is described in detail in relation to FIG. 4. Briefly, the processor 105 attempts to identify a first application in the user list, where the first application is associated with a primary format corresponding to the file format of the file in the user's request. If the processor 105 identifies such a first application in the first stage, the first application is used to open the file.

FIG. 4 is a flowchart of a method 400, as performed by the processor 105, for opening a file using an appropriate application, according to an illustrative embodiment. The method 400 includes the steps of receiving a request from a user to open a file having a file format (step 402), identifying a first list of applications associated with primary formats corresponding to the file format (step 404), and determining whether the first list is empty (decision block 406). If the first list is not empty, a first application is selected in the first list (step 408), and the file is opened using the first application (step 410).

At step 402, the processor 105 receives a request from a user to open a file having a file format. The user may transmit an "open file by default" request to access the file over the user device 114. For example, the user may use a user input device such as a keyboard or a mouse at a user interface on the user device 114 to indicate the request (by using a left-click on a mouse or any other suitable user input, for example). After receiving user authentication information over the user interface, the user device 114 may display metadata associated with the file. The metadata may include a file name, a date and time created, a file format, or any other suitable metadata associated with a file. The user may select the file and request to access the file.

The file may be stored on a database on the multi-tiered registration system 101, the user device 114, the developer device 103, or any other suitable device such as a cloud storage system. If the file is stored on a cloud storage system, the file may be associated with the user. As an example, a portion of a database in the cloud storage system may be allocated to the user. In this case, the user may provide user authentication information (i.e., by providing a username and password or other identification information to a user interface on a web browser, for example) at the user device 114. After authentication, the user device 114 may display a list of folders and files associated with the user stored on the cloud storage system, including the file. In another example, the file may be associated with a different user, who has given access to the file to the original user. In this case, the other user may provide the original user with a link or shortcut to the file, and a data structure may include a data field entry for a list of users with permission to read or write the file. If the data structure indicates that the original user has permission to access the file, the processor 105 may determine to grant the request.

After determining to grant the request, the processor 105 may determine a type of the open request. In particular, the open request may correspond to one or two possible types: "open file by default" type or "open file in general" type. In one example, when the open request is an "open file by default" type, the processor identifies a suitable application for opening the file by identifying an application associated with a primary format that corresponds to the file format of the requested file. The processor may automatically identify the application upon determining that the open request is an "open file by default" type. The user may select to transmit an "open file by default" type request if the user wishes for an application to be automatically selected. In another example, when the open request is an "open file in general" type, the processor may identify a suitable list of applications to display to the user. The suitable list may include applications associated with a primary type corresponding to the file format and applications associated with a secondary type corresponding to the file format. The user may then select an application from the displayed list, and the processor 105 identifies the selected application. In this case, the user may select to transmit an "open file in general" type request if the user wishes to manually select an application for opening the file.

At step 404, if the open request is an "open file by default" type, the processor 105 identifies a first list of applications associated with primary formats corresponding to the file format. For example, the first list of applications may include a subset of the user list of applications identified in the method 300. To identify the first list of applications, the processor may cross-reference the file's file format with the primary formats stored in a data structure such as the data structure 200. If the data structure includes all applications associated with the user, any application included in the data structure with a primary format corresponding to the file's format may be marked, flagged, or stored in a first list. In addition, the first list may be sorted according to a value such as the user's preference in the data structure 200. The order of the applications in the first list may be used for identifying an appropriate application in the first list for opening the file.

At decision block 406, the processor 105 determines whether the first list is empty. The processor 105 may determine that the first list is empty by evaluating a size of the first list, for example. In particular, the first list is empty if none of the applications in the user list have primary formats corresponding to the file format of the file. As an example, in the data structure 200, none of the five applications in the user list have a primary format corresponding to a file format of "tif."

Thus, when the user transmits a request to open a file with a file format "tif," the processor 105 determines that the first list of applications is empty.

If the first list is not empty, the processor 105 selects a first application in the first list at step 408. If the first list includes a single application, the processor 105 selects the single application. For example, referring back to the data structure 200, if the user transmits a request to open a file with format "psd," the first list of applications includes only application 514, which is selected at step 408. If the first list includes multiple applications, the processor 105 selects an application in the first list. For example, the multiple applications in the first list may be sorted according to some data related to the applications, such as user preference data or priority data. In this case, the application in the first list associated with the highest user preference or priority may be selected. Alternatively, a prompt may be provided to the user to provide input regarding which of the applications in the first list should be used.

At step 410, the file in the user's request is opened with the selected first application. In an example, the processor 105 may open the file using the selected first application. When the multi-tiered registration system 101 is part of a cloud storage system, the selected first application might not be installed on the user device 114. In this case, the user may interact with the selected first application and the cloud storage system over a web browser to access the content of the file. In another example, the processor 105 may transmit an instruction to a separate device to open the file. In this case, the selected first application may be locally installed on the user device 114, such that upon identifying the selected first application, the processor 105 may transmit an instruction to the user device 114 to open the file using the selected first application.

If the first list is empty, the processor 105 may provide a display or a message to the user indicative that no applications having a primary format corresponding to the file format was identified.

In some embodiments, the user may transmit an "open file in general" request to access the file using an application having a secondary format corresponding to the file format. For example, the user may use a user input device such as a keyboard or a mouse at a user interface on the user device 114 to indicate the request (by using a right-click on a mouse or any other suitable user input, for example). In this case, the processor 105 may identify a general list of applications, where each application in the general list is associated with a primary format or a secondary format corresponding to the file format of the file in the user's request. In this case, the general list of applications is displayed to the user, and the user may manually select an application from the general list to use to open the file. The general list may correspond to a default generic file viewer interface that is displayed to the user via the user device 114. The default generic file viewer interface includes a display of a menu of applications including a list of applications associated with primary formats or secondary formats corresponding to the format of the requested file. In some embodiments, the processor 105 repeats the steps 406, 408, and 410 for the general list of applications to identify a suitable application for opening the requested file.

FIG. 5 is a flowchart of a method 500, as performed by the processor 105, for registering an application with a list of primary formats and a list of secondary formats, according to an illustrative embodiment. The method 500 includes the steps of a developer logging into the system 100 (step 502), receiving a selection of an application from the developer (step 504) and receiving a request from the developer to register a primary format and/or a secondary format for the selected application (step 506). If the processor 105 determines to grant the request and update the list(s) of file formats associated with the application (decision block 508), the appropriate list is updated (step 510). Otherwise, the request is denied (step 512).

At step 502, a developer logs into the system 100. As an example, the developer may authenticate with the multi-tiered registration system 101 by inputting a username and password (or providing other identification information) via the developer device 112. Upon determining that a developer has logged in, the processor 105 may access data associated with the developer. In particular, the developer may be associated with one or more applications on the developer system 103, and the data associated with the developer may include data indicative of the associated one or more applications.

At step 504, the developer selects an application. In particular, the developer may be associated with multiple applications stored on one or more developer systems 103, and the developer may have a developer account with the system 100 which associates the developer with each of these applications. In addition, the same application may have different release versions, and the different versions of the same application may have different lists of primary formats and secondary formats. Thus, at step 504, the developer may specify a version identifier in addition to an application. As an example, after logging in, the developer may be presented with a menu of associated applications and their version identifiers. The developer may select an application by selecting an option from the menu. In another example, the developer may add an application or a new version of an application to the developer's account. In this case, the developer provides data indicative of the new application or version, and the multi-tiered registration system 101 may associate the developer's account with the new application or version.

At step 506, the developer transmits a request to register a primary format and/or a secondary format for the selected application. In some embodiments, the selected application has been previously installed and associated with a list of primary formats and a list of secondary formats. In this case, the developer's request includes a request to update an existing list with a removal, a replacement, or an addition to the list. In some embodiments, the selected application is not yet associated with a list of primary formats or a list of secondary formats when the developer transmits the request. In this case, if the request is granted, a new data entry in a data structure such as the data structure 200 is created for the selected application, and the appropriate fields for the primary and secondary formats are filled in.

At decision block 508, the processor 105 determines whether to grant the developer's request at step 506 by updating the list of primary formats and/or the list of secondary formats. As an example, the processor 105 may deny the request at step 510 if it is determined that the developer does not have appropriate access levels to make such a request for the selected application. Alternatively, at step 512, the processor 105 updates the appropriate list of primary formats and/or secondary formats for the selected application. In particular, the one or more lists may be updated by removing, replacing, or adding one or more formats, or a combination thereof.

In general, the systems and methods disclosed herein for the interaction between a developer and the multi-tiered registration system 101 may include the use of an API for providing an interface between the two systems.

Figure 6:
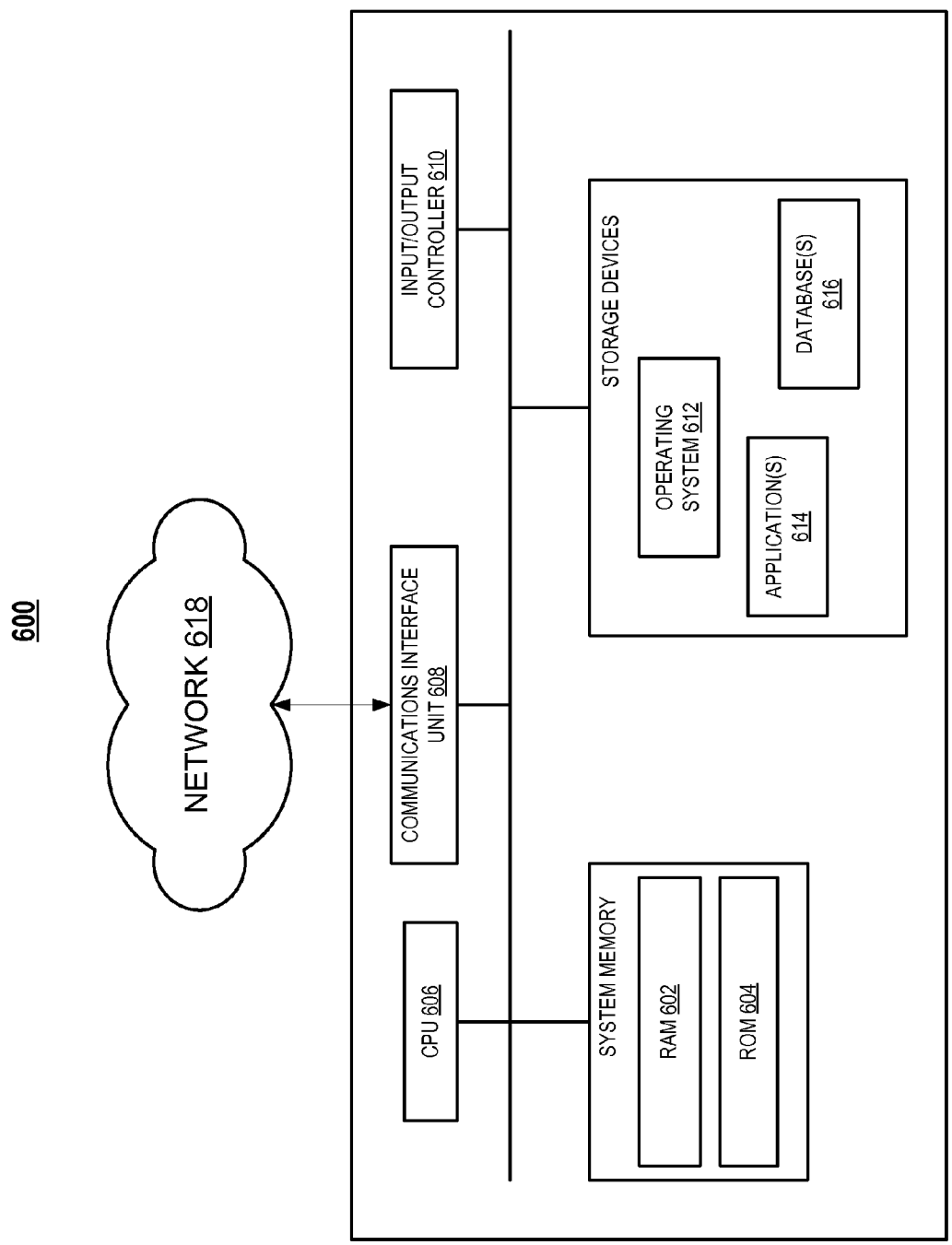
FIG. 6 is a block diagram of a computing device for performing any of the processes described herein, according to an illustrative embodiment.

The components of the system 100 of FIG. 1 may be arranged, distributed, and combined in any of a number of ways. FIG. 6 is a block diagram of a computing device, such as any of the components of the system of FIG. 1, for performing any of the processes described herein, according to an illustrative embodiment. Each of the components of these systems may be implemented on one or more computing devices 600. In certain aspects, a plurality of the components of these systems may be included within one computing device 600. In certain implementations, a component and a storage device may be implemented across several computing devices 600.

The computing device 600 comprises at least one communications interface unit, an input/output controller 610, system memory, and one or more data storage devices. The system memory includes at least one random access memory (RAM 602) and at least one read-only memory (ROM 604). All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 is linked, via network or local network, to other servers or systems.

The computing device 600 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 608 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers or client terminals in the network 618.

The CPU 606 is also in communication with the data storage device. The data storage device may comprise an appropriate combination of magnetic, optical or semiconductor memory, and may include, for example, RAM 602, ROM 604, flash drive, an optical disc such as a compact disc or a hard disk or drive. The CPU 606 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program.

The operating system 612 and applications 614 may be stored, for example, in a compressed, an uncompiled and an encrypted format, and may include computer program code. The instructions of the program may be read into a main memory of the processor from a computer-readable medium other than the data storage device, such as from the ROM 604 or from the RAM 602. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to associating an application with one or more file formats using a multi-tiered registration system as described herein. The program also may include program elements such as an operating system 612, a database management system and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

The invention claimed is:

1. A method for identifying an application using a multi-tiered system, comprising:

receiving, by a processor, registration requests from one or more developers to register each application in a plurality of applications with a list of primary formats and a list of secondary formats, wherein the list of primary formats and the list of secondary formats are mutually exclusive for at least one of the plurality of applications, wherein the list of primary formats is preferable over the list of secondary formats for at least one of the plurality of applications based on a selection of the one or more developers;

receiving, by the processor, an open request from a user to open a file having a file format;

determining, by the processor, whether one or more applications in the plurality of applications is associated with a primary format or a secondary format corresponding to the file format;

selecting, by the processor, an application from the plurality of applications to open the file based at least in part on the determining; and determining whether the open request is a default open request or a general open request, wherein:

if the open request is the default open request, the method further comprises identifying a default list of one or more applications from the plurality of applications, wherein each application in the default list is associated with a user preference; and the selected application corresponds to the application in the default list with a highest user preference.

2. The method of claim 1, wherein the file is one of a plurality of files having a plurality of file formats, the plurality of files being stored on a cloud storage system and associated with the user.

3. The method of claim 1, wherein each application in the default list is associated with a primary format corresponding to the file format.

4. The method of claim 1, wherein if the open request is a general open request, the method further comprises:

providing, by the processor, a general list of one or more applications to the user, wherein each application in the general list is associated with a primary format or a secondary format corresponding to the file format, as specified by the one or more developers, wherein the one or more developers are developers of the applications.

5. The method of claim 4, further comprising:

receiving a user input indicative of a user selection of an application in the general list, and opening the file with the application indicated by the user selection.

6. The method of claim 1, wherein a primary format is a proprietary format associated with the application.

7. The method of claim 1, wherein a list of primary formats or a list of secondary formats associated with an application is empty.

8. The method of claim 1, wherein the determining comprises determining whether one or more applications in the plurality of applications is associated with a secondary format corresponding to the file format, when no applications are associated with a primary format corresponding to the file format.

9. A multi-tiered system for registering an application, comprising a processor configured to:
- receive registration requests from one or more developers to register each application in a plurality of applications with a list of primary formats and a list of secondary formats, wherein the list of primary formats and the list of secondary formats are mutually exclusive for at least one of the plurality of applications, wherein the list of primary formats is preferable over the list of secondary formats for at least one of the plurality of applications based on a selection of at least one or more developers;
- receive an open request from a user to open a file having a file format;
- determine whether one or more applications in the plurality of applications is associated with a primary format or a secondary format corresponding to the file format;
- select an application from the plurality of applications to open the file based at least in part on the determining; and
- determine whether the open request is a default open request or a general open request;
- if the open request is determined to be a default open request:
  - identify a default list of one or more applications from the plurality of applications, wherein each application in the default list is associated with a user preference, and the selected application corresponds to the application in the default list with a highest user preference.

10. The system of claim 9, wherein the file is one of a plurality of files having a plurality of file formats, the plurality of files being stored on a cloud storage system and associated with the user.

11. The system of claim 9, wherein
each application in the default list is associated with a primary format corresponding to the file format.

12. The system of claim 9, wherein if the open request is a general open request, the processor is further configured to provide a general list of one or more applications to the user, wherein each application in the general list is associated with a primary format or a secondary format corresponding to the file format, as specified by the one or more developers, wherein the one or more developers are developers of the applications.

13. The system of claim 12, wherein the processor is further configured to:
- receive a user input indicative of a user selection of an application in the general list, and
- open the file with the application indicated by the user selection.

14. The system of claim 9, wherein a primary format is a proprietary format associated with the application.

15. The system of claim 9, wherein a list of primary formats or a list of secondary formats associated with an application is empty.

16. The system of claim 9, wherein the processor determines whether one or more applications in the plurality of applications is associated with the primary format or the secondary format corresponding to the file format by determining whether one or more applications in the plurality of applications is associated with a secondary format corresponding to the file format, when no applications are associated with a primary format corresponding to the file format.

* * * * *